Figure 1:
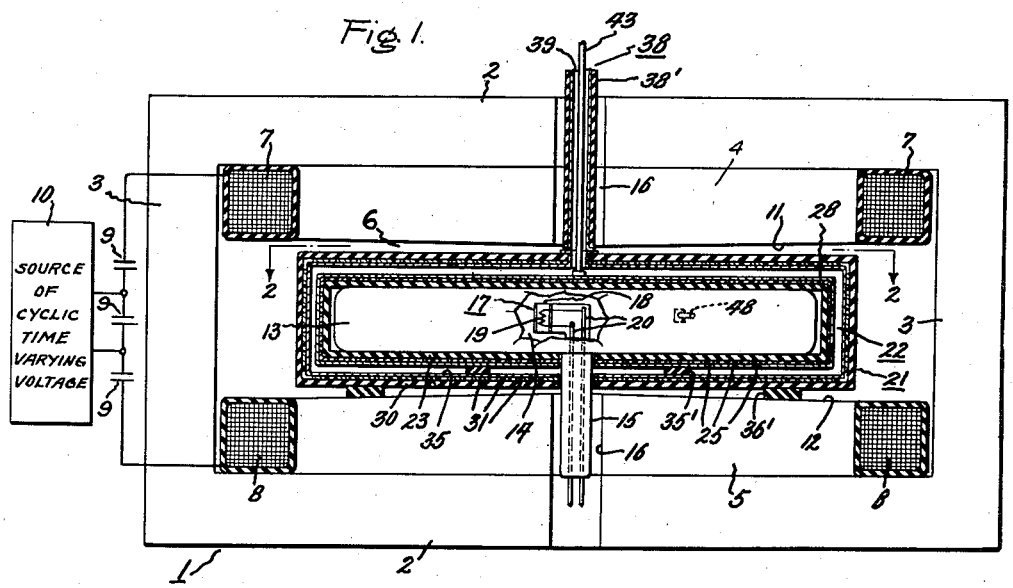

April 8, 1958  A. M. GUREWITSCH  2,830,222
APPARATUS FOR IMPARTING HIGH ENERGY TO CHARGED PARTICLES
Original Filed Sept. 20, 1950  4 Sheets-Sheet 1

INVENTOR.
Anatole M. Gurewitsch,
BY
His Attorney.

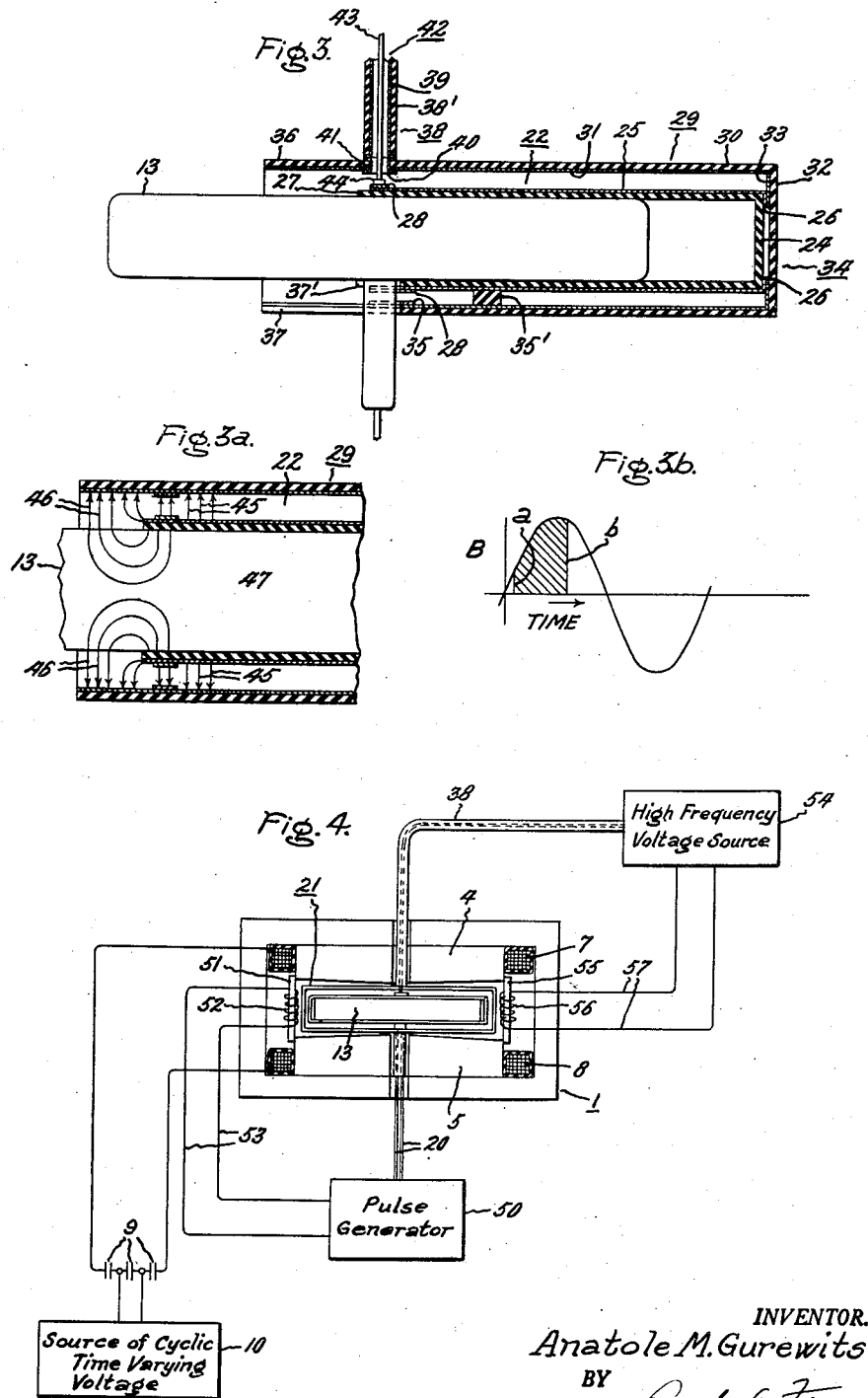

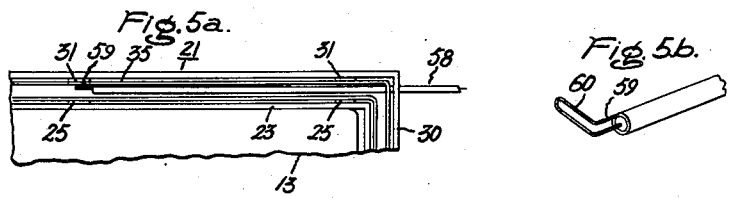
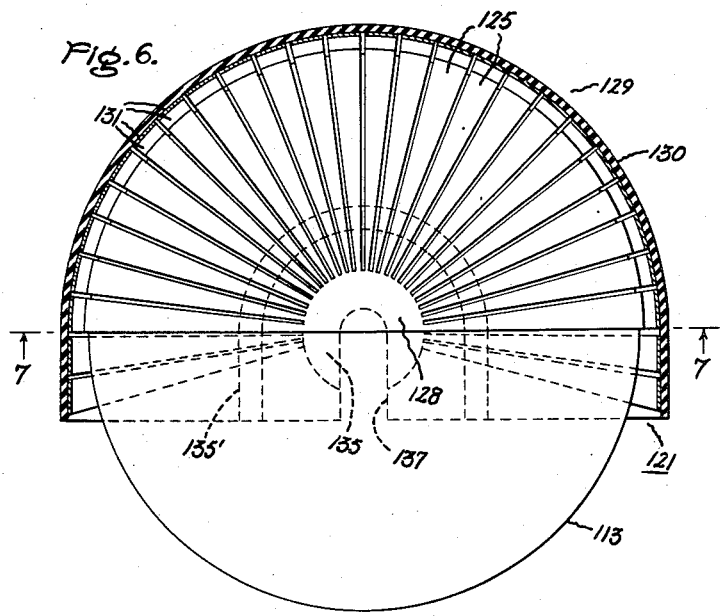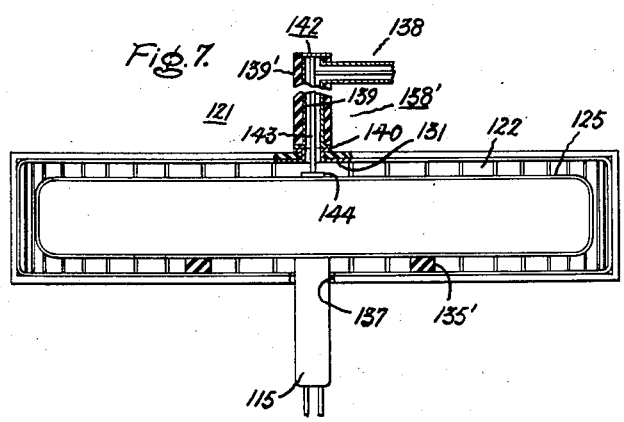

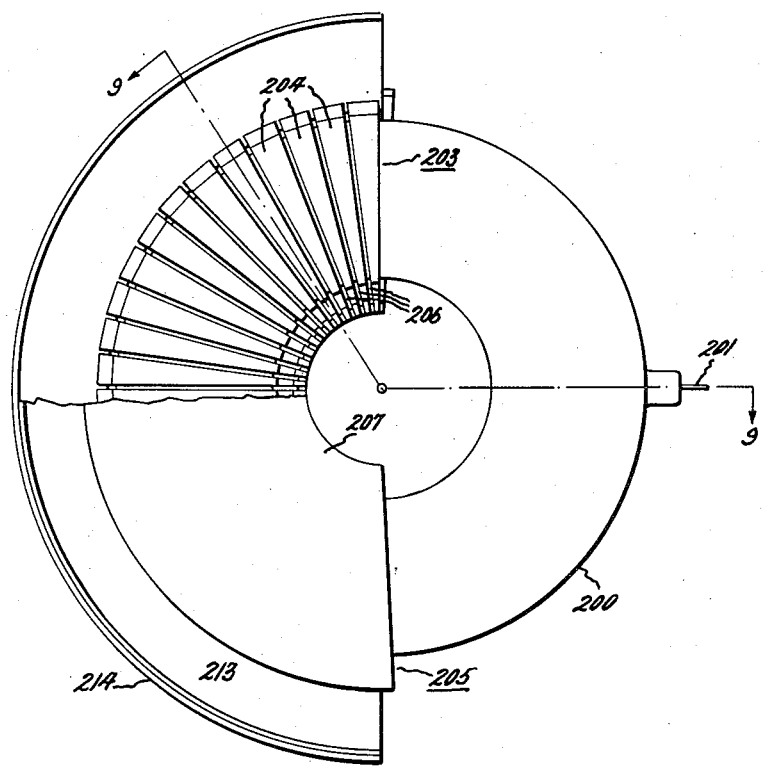
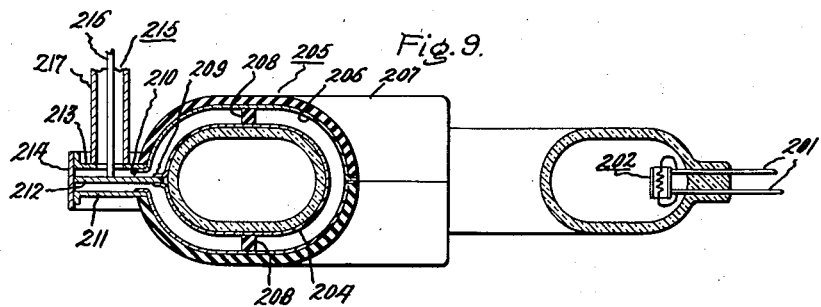

United States Patent Office 2,830,222
Patented Apr. 8, 1958

2,830,222

APPARATUS FOR IMPARTING HIGH ENERGY TO CHARGED PARTICLES

Anatole M. Gurewitsch, Schenectady, N. Y., assignor to General Electric Company, a corporation of New York Original application September 20, 1950, Serial No. 185,763, now Patent No. 2,673,928, dated March 30, 1954. Divided and this application February 10, 1954, Serial No. 409,380

9 Claims. (Cl. 315—5.18)

The present invention relates to apparatus for imparting high energy to charged particles, particularly electrons. This application is a division of my pending application, Ser. No. 185,763 filed September 20, 1950, now Patent 2,673,928, dated March 30, 1954, and assigned to the present assignee.

In an article entitled "The Synchrotron-A Proposed High Energy Particle Accelerator," Physical Review 68, 143–4 (1945), E. M. McMillan has discussed in general terms a device which makes use of a "phase stability" possessed by certain orbits in apparatus such as that disclosed in U. S. Patent No. 1,948,384—Lawrence, commonly termed a cyclotron. As proposed, such a device involves the repeated application of an oscillating electric field to charged particles as they move within a magnetic field essentially normal to the electric field at the point of application. In these circumstances charged particles, having an energy such that their angular velocity corresponds to the frequency of the electric field, will have an equilibrium energy and a stationary orbit if they arrive at the point of application of the oscillating electric field as the field passes through zero. Particles which arrive at the point of application of the electric field either before or after the electric field passes through zero will follow displaced orbits oscillating about the stationary orbit with both phase and energy varying about their equilibrium values. Acceleration of the particles may be accomplished by changing the value of the equilibrium energy, which, translated into practical terms, means varying either the magnetic field or the frequency of the electric field.

Apparatus employing the above-mentioned "phase stability" principle at least in part has proved to be exceptionally successful in the acceleration of electrons to high energy levels. However, it has been considered inadvisable to utilize this principle throughout the acceleration cycle inasmuch as the electrons would follow a relatively greatly expanding spiral orbit until their velocity approaches that of light; consequently apparatus of this character has usually embodied other means for pre-accelerating electrons to approximately the velocity of light before initiation of means embodying the above-mentioned principle. It is a foremost object of the present invention to provide simple, compact and efficient apparatus for accelerating charged particles to high energy levels by applying this "phase stability" principle of operation throughout the acceleration cycle after electron injection.

According to one important aspect of the present invention more fully explained and described hereinafter, there is provided a magnetic structure having a pair of opposed rotationally symmetrical pole pieces defining a gap between the pole faces thereof and means associated therewith for exciting the magnetic structure to produce a cyclic time-varying magnetic field between the pole faces. The pole faces are outwardly tapered to provide a desired varying radial field strength and an evacuated envelope is disposed within the gap defined therebetween. High frequency electric field directing means is positioned to enclose a portion of the evacuated envelope, and a source of charged particles, such as electrons, is suitably positioned for injection of charged particles into the evacuated envelope. When the magnetic structure is excited, charged particles are injected at a desired time in the cycle of magnetic field and thereafter are accelerated in stable expanding spiral paths by the high frequency electric field directing means which acts repetitively to apply an accelerating force to the particles as they traverse the electric field generated thereby. When the charged particles have been accelerated to a desired energy level, they may be directed to a suitable target for the useful production of X-rays.

Figure 2:
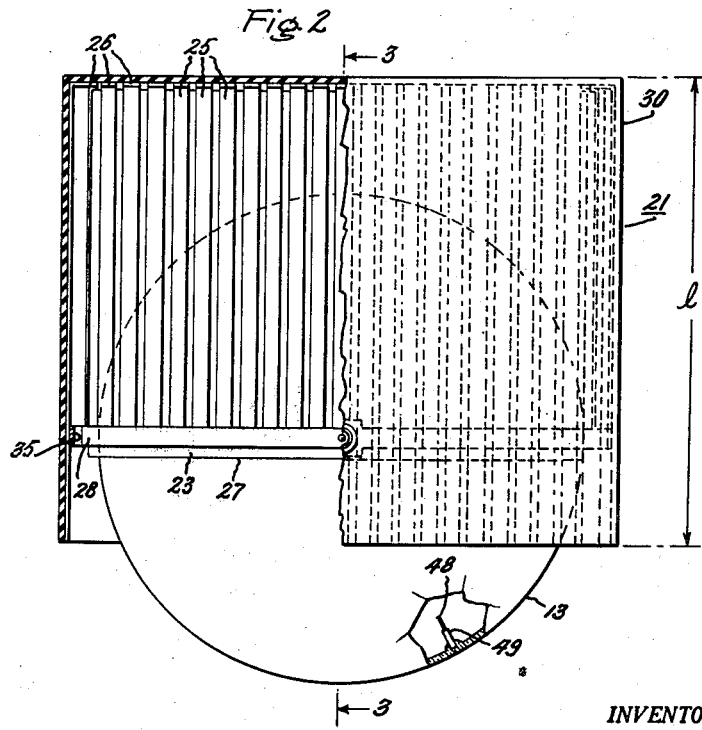

The features of the invention desired to be protected herein are pointed out in the appended claims. The invention itself, together with further objects and advantages thereof, may best be understood by reference to the following description, taken in connection with the accompanying drawings in which Fig. 1 is a partially sectionalized view of accelerator apparatus suitably embodying the invention; Fig. 2 is a sectionalized view taken along line 2—2 of Fig. 1 with the discharge vessel partly broken away; Fig. 3 is a sectionalized view taken along line 3—3 of Fig. 2; Fig. 3a is a fragmentary view of the apparatus of Fig. 1; Fig. 3b is a diagrammatic view useful in explaining the invention; Fig. 4 is a simplified schematic representation of circuitry suitable for energizing the accelerator apparatus of the invention; Figs. 5a and 5b are fragmentary views illustrating alternative means for exciting the resonant structure; Fig. 6 is a partially sectionalized view of one alternative form for the envelope and resonant structure of Fig. 1; Fig. 7 is a partially sectionalized view taken along line 7—7 of Fig. 6; Fig. 8 is a view showing another alternative form of the envelope and resonant structure of Fig. 1 with the resonant structure partly broken away; and Fig. 9 is a sectionalized view taken along line 9—9 of Fig. 8.

Referring particularly to Figs. 1, 2, and 3 there is shown a magnetic structure 1 which comprises yoke portions 2, leg portions 3 and a pair of opposed rotationally symmetrical pole pieces 4 and 5, all of which may be laminated to prevent the generation of excessive eddy currents therein when structure 1 is excited by a time-varying magnetic field. To provide a desired magnetic field in the gap 6 between pole pieces 4 and 5, series-connected energizing windings 7 and 8 are disposed respectively about pole pieces 4 and 5 and connected, as indicated, in circuit with power factor correcting capacitors 9 to a conventionally represented source of cyclic time-varying voltage 10. In order that the time-varying magnetic field existing in gap 6 when magnetic structure 1 is energized by windings 7 and 8 may have a desired radial variation in accordance with principles to be described hereinafter, pole pieces 4 and 5 are provided respectively with pole faces 11 and 12 having an inverse slope with radius as shown.

Positioned within the gap 6 between pole faces 11 and 12 is a closed generally cylindrical vessel 13 of dielectric material which defines within its interior a chamber 14. As will be explained in greater detail at a later point, vessel or envelope 13 provides a spiral orbital path along which charged particles (i. e. electrons) may be accelerated to high energy levels. Envelope 13 is preferably highly evacuated and is provided with an axial side arm 15 of dielectric material which extends into a central opening 16 in magnetic structure 1 and supports a charged particle source 17 within chamber 14. Charged particle source 17 may comprise a shield member 18 and a filamentary cathode 19 supported and energized through conductors 20 sealed into side arm 15. A more detailed description of a charged particle source suitable for employment in this connection may be found in U. S. Patent 2,499,192, granted February 28, 1950, to James M. Lafferty and assigned to the assignee of the present invention.

For the purpose of providing means for accelerating electrons within envelope 13 after they have been injected from charged particle source 17, there is shown high frequency field directing means 21 which encloses a portion of envelope 13 in gap 6 between pole faces 11 and 12. High frequency field directing means or resonator 21 comprises an inner conductor 22 which includes a box of dielectric material 23 supported upon the exterior surface of envelope 13. Box 23 may be open-ended or may be closed as shown at the end 24 remote from envelope 13. Attached to the outer sides of box 23 is a plurality of longitudinally extending spaced apart conductive strips 25 which may project over the end 24 of box 23 as is indicated at 26. Near end 27 opposite end 24 of box 23 conductive strips 25 may terminate adjacent the axis of envelope 13. To connect together or short-circuit strips 25, transverse peripheral conductive strip 28 is positioned adjacent the termination of strips 25 near end 27 of box 23. The outer conductor 29 of resonator 21 includes a rectangular shaped box of dielectric material 30 upon the interior sides of which are positioned longitudinally extending spaced apart conductive strips 31 similar to those attached to inner box 23. Box 30 may also be open-ended, may have an inwardly projecting flange 32 to support the inward extensions 33 of strips 31, or may be completely closed at the end remote from envelope 13 as is indicated at 34. The inward extensions 33 of strips 31 are made in order that strips 31 may be short-circuited to strips 25 to provide in effect a short-circuited quarter wave resonator as will be more fully described hereinafter. Strips 31 are also short-circuited to each other by means of a transverse peripheral conductive strip 35 positioned opposite peripheral conductive strip 28.

Strips 25 and 31 may consist of the material such as copper and may be secured respectively to boxes 23 and 30 by means of a suitable adhesive material, i. e. an alkyd resin prepared by reacting a polybasic acid and polyhydric alcohol, such as a resin being prepared from glycerol and phthalic anhydride. To prevent excessive radiation losses when resonator 21 is excited by a source of high frequency, outer conductor 29 including the sides of box 30 and condductive strips 31 is extended beyond end 27 of inner conductor 22 as is shown at 36. Envelope 13 and inner conductor 22 may be supported from outer conductor 29 by means of an arcuate dielectric spacer 35', and outer conductor 29 may be supported by arcuate dielectric spacer 36'. Slots 37 and 37' are provided in the undersides of outer conductor 29 and inner conductor 22 respectively to facilitate the insertion of envelope 13 within resonator 21. Means for conducting energy to resonator 21 may comprise a section of concentric transmission line 38 extending downwardly through central opening 16 and being constructed of a cylinder 38' of dielectric material lined with a thin conductive strip 39 serving as an outer conductor. Strip 39 extends around the lower end of dielectric cylinder 38' to make contact with a flanged sleeve 40 positioned within an aperture 41 in box 30 and, in turn, making contact with strips 31. Sleeve 40 may be attached to liner 39 and strips 31 by any convenient means such as solder. The inner conductor 42 of concentric transmission line section 38 may consist of a metallic rod 43 terminated with a disk 44 attached to peripheral conductive strip 28.

With the proper selection of longitudinal dimensions, such dimensions being in the direction indicated by the line labeled "*l*" in Fig. 2, resonator 21 operates as a short-circuited quarter wave concentric line resonator at a particular excitation frequency. The space between conductive strips 25 and 31 constitutes in effect a space resonant system comprising a quarter wave transmission line section. Accordingly, if resonator 21 is excited at the proper frequency by a high frequency voltage source (not shown) connected to concentric line 38 in a manner well known to those skilled in the art, a cyclically reversible electric field of high intensity may be made to appear between inner conductor 22 and outer conductor 29 as is indicated by arrows 45 of Fig. 3a. At the end of inner conductor 22 adjacent the axis of envelope 13, however, the electric field will extend inwardly and within envelope 13 as is indicated by arrows 46. By choosing the frequency of reversal of this electric field to correspond to the frequency of rotation of charged particles moving within envelope 13, i. e. equal to or a multiple of the frequency of rotation of the charged particles, an increase in the energy level of such charged particles may be effected in accordance with the principles which will be presently described.

As has been mentioned heretofore, the present invention contemplates the initiation of excitation of resonator 21 early in the cycle of magnetic field between pole faces 11 and 12, i. e. at or shortly after the injection of electrons into envelope 13 from gun 17. After injection of electrons and the excitation of resonator 21 the electrons are repetitively accelerated twice per revolution as they pass into and out of resonator 21. As is apparent from Fig. 3a, the region 47 within inner conductor 22 and envelope 13 is electric field-free; hence no acceleration occurs while the electrons are within this region. Thus the electrons are repetitively accelerated with a constant angular velocity throughout a number of revolutions while they are retained within expanding spiral orbital paths by the magnetic field in gap 6 traversing envelope 13. In Fig. 3b wherein the flux density B in gap 6 is plotted vs. time (for present purposes B may be considered to be sinusoidal as shown), line *a* represents the time at which electrons are injected from gun 17 and also the time at which resonator 21 is energized. The electrons are accelerated throughout the portion indicated by the shaded area under the B curve until the time represented by line *b* is reached at or slightly after the peak magnetic flux density is reached. At this time resonator 21 may be de-energized whereby the electrons spiral outwardly to strike a target 48 (Figs. 1 and 2) of tungsten or other suitable material supported by a stud 49 sealed into the wall of envelope 13.

In the construction of the above mentioned apparatus the following relations may be conveniently employed:

$$R = \frac{v}{w} \quad (1)$$

where $R$ = the radius of the particle orbit
$v$ = the linear velocity of the particles, and
$w$ = the angular velocity of the particles Since in the above described apparatus $w$ is maintained constant (by virtue of a constant frequency of excitation of resonator 21 and the above-described phase stability principle) while $v$ varies from the velocity of injection to, in some cases, nearly the velocity of light, the radius $R$ will increase during acceleration of the particles to a value approaching the maximum value of $$R = \frac{c}{w} \quad (2)$$

where $c$ = the velocity of light.

The total energy possessed by the particles, including rest energy and kinetic energy evidenced by a relativistic increase in mass, may be expressed as $$E = \frac{ec^2 B}{w} \quad (3)$$

where $B$ = the flux density of the magnetic field traversing the particle orbit.

It may now be shown that $$R = c\sqrt{\frac{1}{w^2} - \left(\frac{m_0}{e}\right)^2} = \frac{c}{w}\sqrt{1 - \left(\frac{m_0 c^2}{E}\right)^2} \quad (4)$$

where $m_0$ = the rest mass of the particles, and
$e$ = the charge upon the particles If now B is made to vary with time, i. e. sinusoidally as represented in Fig. 3b, then at the time of injection $t_a$, B will be determined by the relation $$B_a = B_0 \sin w_m t_a \quad (5)$$

where $w_m = 2\pi f_m$, the frequency of the magnetic field, and
$B_0$ = the peak value of magnetic flux density With this value of B the total energy of the particles at the time of injection may be ascertained from Equation 3; hence the injection voltage may be determined. Furthermore, Equation 4 may be employed to determine a radius at which injection should take place. The remaining necessary quantity which must be determined, viz. the necessary gain of energy of the particles per turn, may be determined from the following equation:

$$E = ec^2 \frac{f_m}{f^2} \quad (6)$$

where $f$ = the frequency of the electric field produced by resonator 21, and
$f_m$ = the frequency of the magnetic field (e. g. 60 cycles)

At higher energies where radiation loss takes place, an additional amount of energy per turn must be supplied as is indicated by the following relation:

$$L = 8.8 \times \frac{E^4}{r} \times 10^{-32} \quad (7)$$

where $L$ = the gain per turn in electron volts necessary to compensate for radiation losses.

From the above stated relationships it may be ascertained that, for the acceleration of electrons to a final energy of 100 million electron volts, a flux density of .8 weber/meter² and a final orbit radius of approximately 42 centimeters may be employed. The frequency of the electric field produced by resonator 21 may be of the order of 160 megacycles.

In order to maintain stability of the charged particles undergoing acceleration to produce a desired stable beam, the magnetic flux density B in the plane of the orbit in gap 6 must satisfy the following relation:

$$B = B_0 \left(\frac{r_0}{r}\right)^n \quad (8)$$

where $r$ = the radius of the point under consideration
$r_0$ = the maximum radius of the orbit, and
$n$ = an exponential having a value lying between 0 and unity Otherwise expressed this relation is $$H \alpha \frac{1}{r^n} \quad (9)$$

where $H$ = the magnetic field intensity.

To meet this requirement pole faces 11 and 12 are formed with an outward taper as shown and described heretofore.

Referring now to the simplified schematic representation in Fig. 4, wherein reference characters employed hereinbefore serve to represent similar parts, there is shown in diagrammatic fashion circuitry which may be utilized to secure desired operational characteristics for the above-described apparatus. A pulse generator 50 supplies intermittent energization through conductors 20 to electron gun 17 (not shown) at a desired instant in the cycle of magnetic field produced by energizing windings 7 and 8 as determined by a saturable strip 51 around which is positioned a winding 52. It will be understood by those well skilled in the art that saturable strip 51 may be arranged such that it will produce a triggering pulse in winding 52 at a desired time instant in the cycle of magnetic field and that this pulse may be directed through conductors 53 to pulse generator 50 for initiating the energization thereof. In a similar manner, high frequency voltage source 54 may be triggered by means of a saturable strip 55 coupled with a winding 56 which is connected through conductors 57 to high frequency voltage source 54. For a more complete description of circuitry which may be suitably adapted for these purposes, reference may be had to U. S. Patent 2,485,409, issued October 18, 1949, to Herbert C. Pollock and Willem F. Westendorp and assigned to the assignee of the present invention.

In the fragmentary elevation of Fig. 5a, wherein similar numerals are used to designate like parts hereinbefore described, there is shown alternative means for exciting resonator 21. In this embodiment resonator 21 is excited through a concentric transmission line 58 suitably introduced through the side of dielectric box 30 near the end remote from envelope 13. Proper magnetic coupling of a high frequency voltage source (not shown) is assured by making a right angle loop in the inner conductor 59 as is illustrated in the fragmentary view of Fig. 5b. Loop portion 60 of inner conductor 59 should be perpendicular to the plane of the paper in Fig. 5a and may be directed either into or out of the plane of the paper.

Referring now to Figs. 6 and 7 there is shown an alternative resonator and envelope structure which may be employed in connection with the apparatus illustrated in Fig. 1. In this embodiment a generally cylindrical envelope 113 is supported by means of an arcuate spacer member 135' within a resonator 121. Resonator 121 comprises an inner conductor 122 which includes spaced apart radial conductive strips 125 attached to the outer surface of envelope 113 and terminating at their inner ends in a semi-circular shorting strip 128. Outer conductor 129 comprises a generally cylindrical box portion 130 of dielectric material enclosing a portion of envelope 113 and having attached to its inner surface a plurality of spaced apart radial conductive strips 131 which terminate at their inner ends on a conductive short-circuiting strip 135. To facilitate the insertion of envelope 113 within outer conductor 139 the latter is provided with a transverse slot 137 as shown. High frequency energy may be introduced into the structure by means of a concentric transmission line portion 138 which is directly coupled into a concentric line section or stub 138' as illustrated. If more convenient, portion 138 may be coupled into the outer end of stub 138' as will be understood by those skilled in the art. Stub 138' comprises a cylindrical portion 139' of dielectric material which is lined with thin conductive material 139. At its lower end the liner 139 is connected to strips 131 as illustrated at 140, and at its upper end it is short-circuited to an inner conductor 142 which comprises a metallic rod 143 extending downwardly and terminating in a disk 144 which makes contact with strips 125. With the proper selection of dimensions this structure also operates as a quarter wave concentric line resonator at a particular excitation frequency. The space between conductive strips 125 on the exterior surface of envelope 113 and conductive strips 131 on the interior surface of dielectric box 130 may be considered as forming a lumped capacitance across the inner end of concentric line stub or section 138'. Accordingly, if the structure has the proper dimensions and is excited at the proper frequency, a cyclically reversible electric field of high intensity may be made to appear across the inner and outer conductors in a manner similar to that described in connection with Fig. 3a.

In Figs. 8 and 9 there is shown another alternative form of resonator and envelope structure which may be advantageously employed in connection with the apparatus of Fig. 1. In this embodiment charged particles may be accelerated within a closed annular envelope 200 of dielectric material within the wall of which there are sealed energizing conductors 201 supporting a charged particle source or electron gun 202. Enclosing a portion of annular envelope 200, there is shown resonator structure which comprises an inner conductor 203 including a plurality of spaced coaxial conductive strips 204 suitably attached to the outer surface of envelope 200. An outer conductor 205 comprises a plurality of spaced coaxial conductive strips 206 suitably attached to the interior surface of an annular section 207 of dielectric material. Loops 203 along with envelope 200 may be supported in spaced coaxial relationship with respect to outer conductor 205 by means of dielectric spacers 208. Loops 204 and 206 have discontinuous peripheries to form respectively aligned gaps 209 and 210. Positioned along the outer surface of annular section 207 are three arcuate spaced parallel plates 211, 212, and 213 forming extensions of inner conductor 203 and outer conductor 205. The inner conductive plate projects through gap 210 and terminates at its inner end in gap 209 to make contact with loops 204 as shown. The two outer plates 211 and 213 terminate in gap 210 to make contact with loops 206. At their outer or distal ends plates 211, 212, and 213 are short-circuited by an arcuate plate 214. High frequency energy may be conducted into the resonator structure by means of a concentric line 215 having an inner conductor 216 connected directly to plate 212 and an outer conductor 217 connected directly to plate 213. It will be now understood by those skilled in the art that this structure will operate in a similar fashion to that disclosed in Figs. 6 and 7 to accelerate charged particles twice per revolution as they pass into and out of the structure. The space between conductive loops 204 and 206 may be considered as forming a lumped capacitance across the inner end of parallel plates 211, 212, and 213 which act as a transmission line short-circuited at the opposite end.

From the foregoing description of the various embodiments of the invention it will be apparent that advantageous accelerator apparatus is provided. Since it is not necessary to produce a time-varying magnetic flux linking the charged particle orbit to pre-accelerate the particles, opening 16 may be employed as a means of reducing the amount of iron in magnetic structure 1 and also as a means of introducing various lead-in conductors. Furthermore, the strips from which the resonator structure are constructed minimize the generation of eddy-currents by the time-varying magnetic field. Moreover, large radial spaces are available for initial oscillations of the charged particles about the orbit and, therefore, the increase in output of the apparatus is facilitated.

What I claim as new and desire to secure by Letters Patent of the United States is:

1. In combination, a closed annular envelope of dielectric material within which charged particles may be accelerated, means providing a source of charged particles within the envelope and a high frequency resonator enclosing a portion of said envelope, said resonator comprising an outer conductor which includes a hollow annular section of dielectric material having radially extending conductive loops spaced along its inner surface and a circumferential gap along its outer periphery, an inner conductor which includes radially extending conductive loops spaced along the outer surface of said envelope, and spaced parallel plates forming extensions of said outer and inner conductors through said circumferential gap in said outer conductor.

2. In combination, a closed annular envelope of dielectric material within which charged particles may be accelerated, means providing a source of charged particles within the envelope and a high frequency resonator enclosing a portion of said envelope, said resonator comprising an outer conductor which includes a hollow annular section of dielectric material having spaced radially extending conductive loops along its inner surface and a circumferential gap along its outer periphery, an inner conductor which includes radially extending conductive loops spaced along the outer surface of said envelope, and spaced parallel plates forming extensions of said inner and outer conductors in planes perpendicular to the axis of said envelope through said circumferential gap in said outer conductor.

3. In combination, a closed annular envelope of dielectric material within which charged particles may be accelerated, means providing a source of charged particles within the envelope and a high frequency resonator enclosing a portion of said envelope, said resonator comprising an outer conductor which includes a hollow annular section of dielectric material having spaced radially extending conductive loops along its inner surface and a circumferential gap along its outer periphery, an inner conductor which includes radially extending conductive loops spaced along the outer surface of said envelope, and spaced parallel plates forming extensions of said inner and outer conductors in planes perpendicular to the axis of said envelope through said circumferential gap in said outer conductor, said spaced parallel plates being terminated at their ends remote from said inner and outer conductors by a short-circuiting plate.

4. In combination, a closed annular envelope of dielectric material within which charged particles may be accelerated, means providing a source of charged particles within the envelope a high frequency resonator enclosing a portion of said envelope, said resonator comprising an outer conductor which includes a hollow annular section of dielectric material having spaced radially extending conductive loops along its inner surface and a circumferential gap along its outer periphery, an inner conductor which includes radially extending conductive loops spaced along the outer surface of said envelope, and spaced parallel plates forming extensions of said inner and outer conductors in planes perpendicular to the axis of said envelope through said circumferential gap in said outer conductor, said spaced parallel plates being short-circuited at their distal ends, and means for exciting said resonator comprising a section of coaxial transmission line coupled to said parallel plates.

5. A resonator structure comprising an inner conductor which includes a plurality of spaced coaxial conductive loops, an outer conductor which includes a plurality of spaced coaxial conductive loops, and three spaced parallel plates extending essentially perpendicular to the common axis of said inner and outer conductors, the two outer plates being attached to said outer conductor and the central plate being attached to said inner conductor.

6. A resonator structure comprising an inner conductor which includes a plurality of spaced coaxial conductive loops, an outer conductor which includes a plurality of spaced coaxial conductive loops, and three spaced parallel plates extending essentially perpendicular to the common axis of said inner and outer conductors, the two outer plates being attached to said outer conductor and the central plate being attached to said inner conductor, all said three plates being interconnected at their distal ends.

7. A resonator structure comprising an inner conductor which includes a plurality of spaced coaxial conductive loops, an outer conductor which includes a plurality of spaced conductive loops having aligned gaps in the peripheries thereof, and three spaced parallel plates forming extensions of said inner and outer conductors, the two outer plates being attached to said outer conductive loops within the gaps therein, the central plate extending through said gaps in said outer conductive loops and being attached to said inner conductive loops.

8. A resonator structure comprising an inner conductor which includes a plurality of spaced coaxial conductive loops having aligned gaps in the peripheries thereof, an outer conductor which includes a plurality of spaced coaxial conductive loops having aligned gaps in the peripheries thereof, the gaps in said inner and outer conductors being transversely aligned, and three spaced parallel plates forming extensions of said inner and outer conductors, the two outer plates being attached to said outer conductive loops within the gaps therein and the central plate being attached to said inner conductive loops within the gaps therein.

9. A resonator structure comprising an inner conductor which includes a plurality of spaced coaxial conductive loops having aligned gaps in the peripheries thereof, an outer conductor which includes a plurality of spaced coaxial conductive loops having aligned gaps in the peripheries thereof, the gaps in said inner and outer conductors being transversely aligned, and three spaced parallel plates forming extensions of said inner and outer conductors, the two outer plates being attached to said outer conductive loops within the gaps therein and the central plate being attached to said inner conductive loops within the gaps therein, the said three spaced parallel plates being interconnected at their distal ends.

References Cited in the file of this patent

UNITED STATES PATENTS

| | | |
|---|---|---|
| 2,402,948 | Carlson | July 2, 1926 |
| 2,500,749 | Gurewitsch | Mar. 14, 1950 |
| 2,523,725 | Schmidt | Sept. 26, 1950 |
| 2,579,315 | Gurewitsch | Dec. 18, 1951 |
| 2,593,095 | Brehm | Apr. 15, 1952 |
| 2,641,734 | Sloan | June 9, 1953 |
| 2,673,928 | Gurewitsch | Mar. 30, 1954 |